(12) United States Patent
Nakajima

(10) Patent No.: US 12,399,159 B2
(45) Date of Patent: Aug. 26, 2025

(54) LIQUID FEEDING UNIT, AND LIQUID CHROMATOGRAPHY ANALYSIS SYSTEM AND CONTROL METHOD THEREOF

(71) Applicant: SHIMADZU CORPORATION, Kyoto (JP)

(72) Inventor: Kosuke Nakajima, Singapore (SG)

(73) Assignee: SHIMADZU CORPORATION, Kyoto (JP)

( * ) Notice: Subject to any disclaimer, the term of this patent is extended or adjusted under 35 U.S.C. 154(b) by 568 days.

(21) Appl. No.: 17/866,677

(22) Filed: Jul. 18, 2022

(65) Prior Publication Data

US 2023/0098252 A1 Mar. 30, 2023

(30) Foreign Application Priority Data

Sep. 23, 2021 (SG) .............................. 10202110521T

(51) Int. Cl.
| | |
|---|---|
| *G01N 30/34* | (2006.01) |
| *B01D 15/16* | (2006.01) |
| *G01N 30/02* | (2006.01) |
| *G01N 30/16* | (2006.01) |
| *G01N 30/22* | (2006.01) |
| *G01N 30/32* | (2006.01) |

(52) U.S. Cl.
CPC ........... *G01N 30/34* (2013.01); *B01D 15/166* (2013.01); *G01N 30/22* (2013.01); *G01N 2030/027* (2013.01); *G01N 30/16* (2013.01); *G01N 2030/324* (2013.01); *G01N 2030/326* (2013.01); *G01N 2030/328* (2013.01); *G01N 2030/347* (2013.01)

(58) Field of Classification Search
None
See application file for complete search history.

(56) References Cited

U.S. PATENT DOCUMENTS

| | | | |
|---|---|---|---|
| 2002/0011437 A1* | 1/2002 | Kaito | ...................... G01N 30/34 210/198.1 |
| 2002/0117447 A1 | 8/2002 | Wheat et al. | |
| 2003/0034307 A1 | 2/2003 | Berger et al. | |
| 2004/0035789 A1 | 2/2004 | Wheat et al. | |

(Continued)

OTHER PUBLICATIONS

Office Action issued Oct. 23, 2024 in Chinese Patent Application No. 202211139238.3.

(Continued)

*Primary Examiner* — Krishnan S Menon
(74) *Attorney, Agent, or Firm* — Sughrue Mion, PLLC

(57) ABSTRACT

A first solution is supplied from a first pump. A second solution is supplied from a second pump. A flow path from the first pump and the second pump to a column is switched between a first flow path and a second flow path. In the first flow path, a first mixer is located upstream of an injection part for a sample, and the second mixer is located downstream of the injection part. In the second flow path, the first mixer and the second mixer are located upstream of the injection part. The first flow path is formed in a first mode in which the sample is diluted before introduction into the column. The second flow path is formed in a second mode in which the sample is not diluted before introduction into the column.

1 Claim, 12 Drawing Sheets

(56) References Cited

U.S. PATENT DOCUMENTS

| | | | | |
|---|---|---|---|---|
| 2008/0245715 | A1* | 10/2008 | Iwata | G01N 30/468 |
| | | | | 210/198.2 |
| 2008/0264848 | A1 | 10/2008 | Wheat et al. | |
| 2010/0176043 | A1 | 7/2010 | Wheat et al. | |
| 2020/0158701 | A1* | 5/2020 | Minohata | G01N 30/461 |

OTHER PUBLICATIONS

Japanese Office Action dated Aug. 8, 2023 in Application No. 2022-146912.

* cited by examiner

FIG.8

| | (1) CHANGE OF DILUTION FACTOR | (2) INTRODUCTION COST | (3) CHANGE OF DILUTION MIXER | (4) CHANGE OF GRADIENT MIXER | (5) PERFORMANCE OF STANDARD INJECTION |
|---|---|---|---|---|---|
| BYPASS SCHEME (FIG. 4) | C | A | B | A | C |
| DILUTING SOLUTION INTRODUCTION SCHEME (FIG. 5) | A | C | B | A | B |
| SAMPLE SOLUTION INTRODUCTION SCHEME (FIG. 6) | A | C | B | A | C |
| GRADIENT DILUTION SCHEME (FIG. 7) | A | A | B | B | C |
| THE PRESENT EMBODIMENT (FIGS. 2, 3) | A | A | A | A | A |

LIQUID FEEDING UNIT, AND LIQUID CHROMATOGRAPHY ANALYSIS SYSTEM AND CONTROL METHOD THEREOF

BACKGROUND OF THE INVENTION

Field of the Invention

The present disclosure relates to a liquid chromatography analysis system that provides a mobile phase according to a gradient elusion method.

Description of the Background Art

The gradient elusion method is an analysis method of using a compound liquid of a plurality of solvents as a mobile phase in a liquid chromatography analysis. Some conventional systems are configured to supply a mobile phase according to the gradient elusion method. Some conventional liquid chromatography analysis systems are configured to dilute a sample before introduction into a column.

Techniques regarding the above systems are disclosed in, for example, PTL 1 (U.S. Patent Application Publication No. 2002/117447), PTL 2 (U.S. Patent Application Publication No. 2004/035789), PTL 3 (U.S. Patent Application Publication No. 2008/264848), and PTL 4 (U.S. Patent Application Publication No. 2010/176043).

However, if the conventional systems are provided with a configuration for diluting a sample before introduction into a column, they are not suitable for an analysis in a mode in which the sample is not diluted before introduction into the column.

Thus, such a technique is required that adapts a liquid chromatography analysis system to both of an analysis in a mode in which the sample is diluted before introduction into the column and an analysis in a mode in which the sample is not diluted before introduction into the column.

SUMMARY OF THE INVENTION

A liquid feeding unit according to an aspect of the present disclosure is a liquid feeding unit that feeds a first solution and a second solution as a mobile phase to a column of a liquid chromatography analysis system. The first solution is supplied from a first pump. The second solution is supplied from a second pump. The liquid chromatography analysis system includes an injection part into which a sample is injected. The liquid feeding unit includes a first mixer, a second mixer, and a switch device that switches a flow path from the first pump and the second pump to the column between a first flow path and a second flow path. The first mixer and the second mixer are included in each of the first flow path and the second flow path. In the first flow path, the first mixer is located upstream of the injection part, and the second mixer is located downstream of the injection part. In the second flow path, the first mixer and the second mixer are located upstream of the injection part. The switch device forms the first flow path as the flow path in a first mode in which the sample is diluted before introduction into the column. The switch device forms the second flow path as the flow path in a second mode in which the sample is not diluted before introduction into the column.

A liquid chromatography analysis system according to an aspect of the present disclosure is a liquid chromatography analysis system that uses a first solution and a second solution as a mobile phase. The liquid chromatography analysis system includes a column, a first pump that supplies the first solution, a second pump that supplies the second solution, a sampler that injects a sample toward the column, a first mixer, a second mixer, and a switch device that switches a flow path from the first pump and the second pump to the column between a first flow path and a second flow path. The first mixer and the second mixer are included in each of the first flow path and the second flow path. In the first flow path, the first mixer is located upstream of an injection part into which the sample is injected by the sampler, and the second mixer is located downstream of the injection part. In the second flow path, the first mixer and the second mixer are located upstream of the injection part. The switch device forms the first flow path as the flow path in a first mode in which the sample is diluted before introduction into the column. The switch device forms the second flow path as the flow path in a second mode in which the sample is not diluted before introduction into the column.

A control method for a liquid chromatography analysis system according to an aspect of the present disclosure is a control method for a liquid chromatography analysis system that uses a first solution and a second solution as a mobile phase, and the control method is implemented by a computer. The control method includes: obtaining an analysis mode; and controlling a flow path from a first pump and a second pump to a column of the liquid chromatography analysis system in accordance with the analysis mode, the first pump supplying the first solution, the second pump supplying the second solution. The liquid chromatography analysis system includes an injection part into which a sample is injected, a first mixer, and a second mixer. The controlling the flow path includes, when the analysis mode is a first mode in which the sample is diluted before introduction into the column, controlling the flow path such that the first mixer is located upstream of the injection part and the second mixer is located downstream of the injection part. The controlling the flow path includes, when the analysis mode is a second mode in which the sample is not diluted before introduction into the column, controlling the flow path such that the first mixer and the second mixer are located upstream of the injection part.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 shows evaluations of a configuration of an embodiment and each of configurations of the existing techniques in terms of five criteria.

DESCRIPTION OF THE PREFERRED EMBODIMENTS

Figure 1:
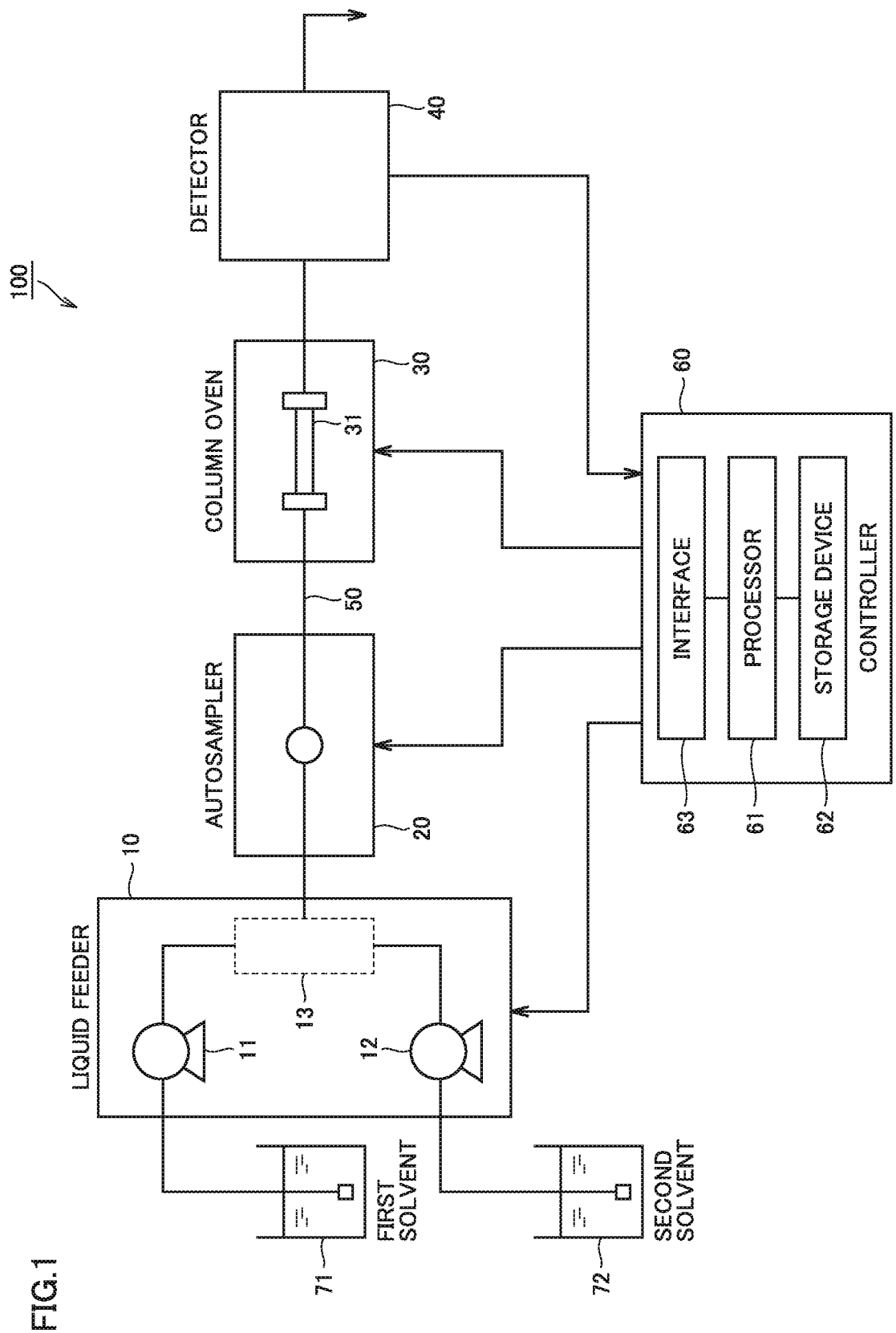
FIG. 1 shows a schematic configuration of an LC system 100 of the present disclosure.

A liquid chromatography analysis system (referred to as "LC system" below) according to an embodiment of the present disclosure will be described below in detail with reference to the drawings. The same or corresponding parts in the drawings have the same reference characters allotted, and description thereof will not be repeated.

[Schematic Configuration of Liquid Chromatography Analysis System]

FIG. 1 shows a schematic configuration of an LC system 100 of the present disclosure. As shown in FIG. 1, LC system 100 includes a liquid feeder 10, an autosampler 20, a column oven 30, a detector 40, an analysis flow path 50, and a controller 60.

LC system 100 is configured to supply a mobile phase according to a gradient elusion method. In LC system 100, a first solvent and a second solvent are prepared as solvents constituting the mobile phase. Liquid feeder 10 is connected with a tank 71 that contains the first solvent and a tank 72 that contains the second solvent. The first solvent and the second solvent are different from each other in dilution power. In one implementation, the first solvent is water, and the second solvent is methanol. Liquid feeder 10 mixes the first solvent and the second solvent to supply analysis flow path 50 with the mobile phase according to the gradient elusion method.

Liquid feeder 10 includes a first pump 11 that supplies the first solvent to analysis flow path 50 and a second pump 12 that supplies the second solvent to analysis flow path 50. Controller 60 controls the respective flow velocities of first pump 11 and second pump 12 to adjust the respective flow rates of the first solvent and the second solvent in the mobile phase, thereby adjusting a ratio between the first solvent and the second solvent in the mobile phase.

Liquid feeder 10 further includes a liquid feeding unit 13 that mixes the first solvent supplied from first pump 11 and the second solvent supplied from second pump 12. The configuration of liquid feeding unit 13 will be described below in detail with reference to FIGS. 2 and 3.

Autosampler 20 injects a sample into analysis flow path 50.

Column oven 30 includes a column 31. Column 31 is used to separate the sample injected into analysis flow path 50 by autosampler 20. Column 31 is accommodated in column oven 30. Column oven 30 controls the temperature of column 31 to a preset temperature.

Detector 40 is a device for detecting one or more components separated from the sample in column 31. Detector 40 obtains a detection signal based on each of the one or more components separated in column 31 and transmits the detection signal to controller 60.

Controller 60 controls operations of liquid feeder 10, autosampler 20, and column oven 30 and creates various mathematical operations and chromatograms based on the detection signal obtained by detector 40.

Controller 60 includes a processor 61, a storage device 62, and an interface 63. Processor 61 performs the control described above and mathematical operations for creating the chromatograms. Storage device 62 stores a program and data for the above mathematical operations. Interface 63 functions as an interface for communications between processor 61 and each of liquid feeder 10, autosampler 20, and column oven 30.

[Standard Mode and Dilution Mode]

A sample may be diluted in order to adjust a peak shape of a chromatogram created for the sample. Herein, in LC system 100, an analysis mode when a sample is analyzed without dilution is referred to as "standard mode", and an analysis mode when a diluted sample is analyzed is referred to as "dilution mode".

"Dilution mode" is an example of the first mode in which the sample is diluted before introduction into column 31. "Standard mode" is an example of the second mode in which the sample is not diluted before introduction into column 31.

[Schematic Configuration of Liquid Feeding Unit]

Figure 2:
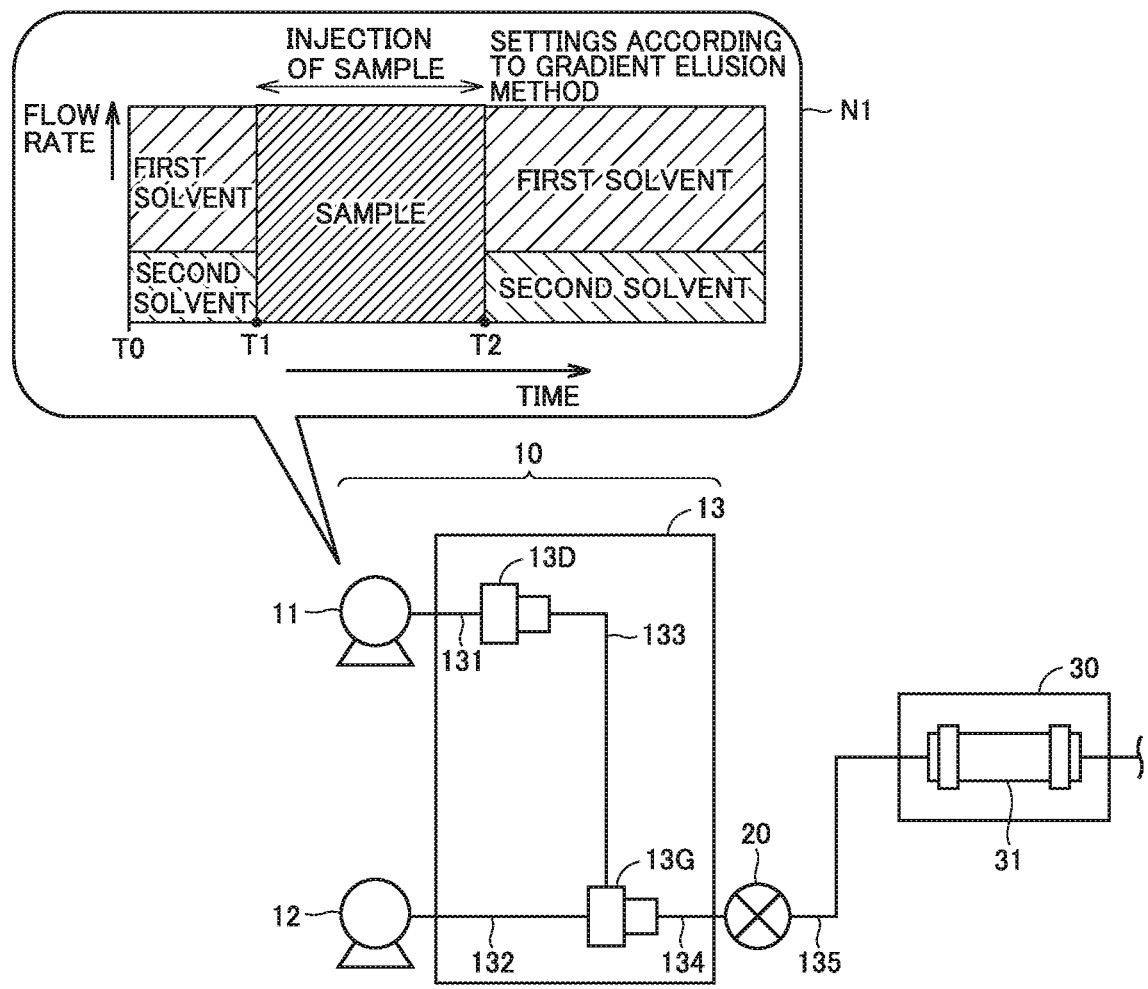
FIG. 2 shows a position of a liquid feeding unit 13 in a standard mode.
Figure 3:
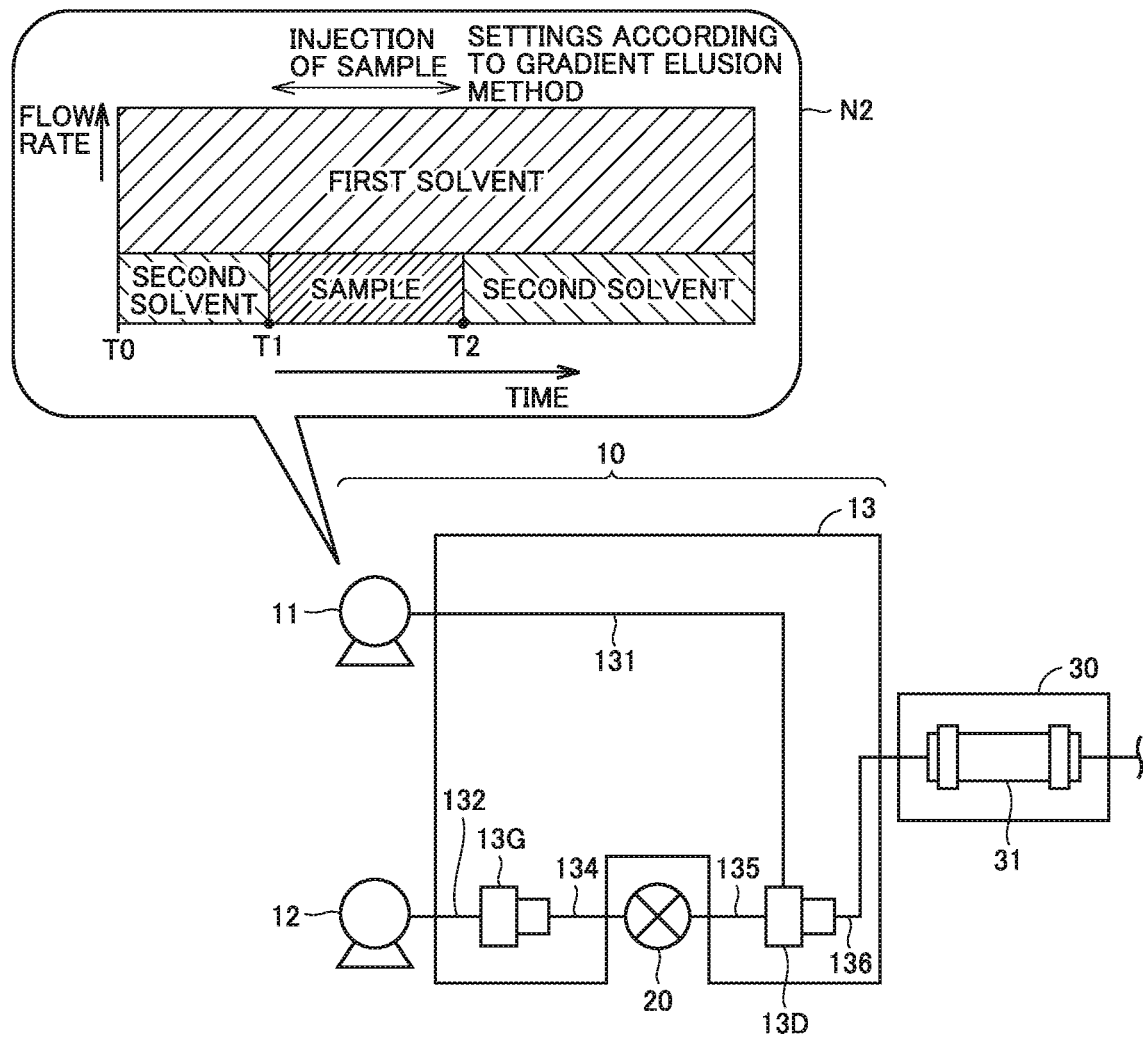
FIG. 3 shows a position of liquid feeding unit 13 in a dilution mode.

In LC system 100, liquid feeding unit 13 takes positions for forming different paths between the standard mode and the dilution mode. FIG. 2 shows a position of liquid feeding unit 13 in the standard mode. The position shown in FIG. 2 is also referred to as "standard position". FIG. 3 shows a position of liquid feeding unit 13 in the dilution mode. The position shown in FIG. 3 is also referred to as "dilution position".

As shown in FIGS. 2 and 3, liquid feeding unit 13 includes a first mixer 13G and a second mixer 13D. Each of first mixer 13G and second mixer 13D includes a mixing chamber that contains liquids supplied from a plurality of supply sources. The mixing chamber has an opening for discharging the liquids supplied from the plurality of supply sources in a mixed state. In one implementation, each of first mixer 13G and second mixer 13D is implemented by a gradient mixer manufactured by Shimadzu Corporation (https://www.an.shimadzu.co.jp/hplc/prominence/modules/8_option.htm). The mixing capacity of each of first mixer 13G and second mixer 13D is based on the capacity of its mixing chamber.

In the example of FIG. 2, liquid feeding unit 13 includes pipes 131 to 134. In the example of FIG. 2, pipes 131 to 134 constitute a flow path, which extends from first pump 11 and second pump 12 to column 31, of analysis flow path 50.

In the example of FIG. 3, liquid feeding unit 13 includes pipes 131, 132, and 134 to 136. In the example of FIG. 3, pipes 131, 132, and 134 to 136 constitute a flow path, which extends from first pump 11 and second pump 12 to column 31, of analysis flow path 50.

(FIG. 2: Standard Position)

At the standard position shown in FIG. 2, the first solvent supplied from first pump 11 is introduced through pipe 131 into second mixer 13D, and then introduced through pipe 133 into first mixer 13G. On the other hand, the second solvent supplied from second pump 12 is introduced through pipe 132 into first mixer 13G. The first solvent and the second solvent are mixed in first mixer 13G, and then introduced through pipe 134 and pipe 135 into column 31.

In FIG. 2, an injection part for the sample from autosampler 20 in analysis flow path 50 is indicated as "autosampler 20". In FIG. 2, the sample injected from autosampler 20 is introduced through pipe 135 into column 31.

At the standard position shown in FIG. 2, the first solvent supplied from first pump 11 flows through second mixer 13D and then first mixer 13G, and then through (the injection part of) autosampler 20. In other words, first mixer 13G and second mixer 13D are located upstream of (the injection part of) autosampler 20.

FIG. 2 shows a supplement N1 for illustrating a liquid feeding pattern in the standard mode. Supplement N1 includes a graph indicating a pattern of liquid feeding to analysis flow path 50 before and after injection of the sample from autosampler 20. In the graph, the vertical axis schematically represents a flow rate of each solution at a sample introduction port of analysis flow path 50, and the horizontal axis represents a time.

As indicated in the graph of supplement N1, at a time T0, driving of first pump 11 and second pump 12 is started. Thus, supply of the first solvent and the second solvent to analysis flow path 50 is started. Subsequently, at a time T1 to a time T2, the sample is introduced from autosampler 20 to analysis flow path 50. Specifically, a valve located in autosampler 20 is switched, and the sample filling a sample loop also located in autosampler 20 is introduced into analysis flow path 50 at a flow rate set at time T0.

When the introduction of the sample is complete at time T2, though the flow rate ratio between the first solvent and the second solvent at time T2 and thereafter is constant in FIG. 2, in actuality, the flow rate ratio between the first solvent and the second solvent at time T2 and thereafter may change based on settings (settings according to the gradient elusion method) adopted in the analysis of the sample.

(FIG. 3: Dilution Position)

At the dilution position shown in FIG. 3, the first solvent supplied from first pump 11 is introduced through pipe 131 into second mixer 13D. On the other hand, the second solvent supplied from second pump 12 is introduced through pipe 132 into second mixer 13G, and then introduced through pipe 134 and pipe 135 into second mixer 13D.

At the dilution position shown in FIG. 3, the first solvent and the second solvent are mixed in second mixer 13D, and then introduced through pipe 136 into column 31.

In FIG. 3, an injection part for the sample from the autosampler 20 in analysis flow path 50 is indicated as "autosampler 20" as in FIG. 2. At the dilution position shown in FIG. 3, the sample injected from autosampler 20 is introduced through pipe 135 into second mixer 13D. Subsequently, the sample is diluted with the first solvent in second mixer 13D, and then introduced through pipe 136 into column 31.

At the dilution position shown in FIG. 3, the second solvent supplied from second pump 12 flows through first mixer 13G and then (the injection part of) autosampler 20, and then through second mixer 13D. In other words, first mixer 13G is located upstream of (the injection part of) autosampler 20, and second mixer 13D is located downstream of (the injection part of) autosampler 20.

FIG. 3 shows a supplement N2 for illustrating a liquid feeding pattern in the dilution mode. Supplement N2 includes a graph indicating a pattern of liquid feeding to analysis flow path 50 before and after injection of the sample from autosampler 20. In the graph, the vertical axis schematically represents a flow rate, and the horizontal axis represents a time.

As indicated in the graph of supplement N2, at time T0, driving of first pump 11 and second pump 12 is started. Thus, supply of the first solvent and the second solvent to analysis flow path 50 is started. Subsequently, at time T1 to time T2, a valve located in autosampler 20 is switched, and the sample filling the sample loop also located in autosampler 20 is pushed out by the second solvent fed through driving of second pump 12, so that the sample is introduced into analysis flow path 50. Thus, the pushed-out sample is diluted with the first solvent fed through driving of first pump 11, and the diluted sample is introduced into column 31.

When the introduction of the sample is complete at time T2, a compound liquid of the first solvent and the second solvent mixed at a prescribed ratio is supplied to flow path 50. Though the flow rate ratio between the first solvent and the second solvent at time T2 and thereafter is constant in FIG. 3, in actuality, the flow rate ratio between the first solvent and the second solvent at time T2 and thereafter may change based on settings (settings according to the gradient elusion method) adopted in analysis of the sample.

Specific Configuration Examples According to Existing Techniques

Each of FIGS. 4 to 7 shows a specific configuration example of a liquid feeding unit according to an existing technique. Each specific example will be described below.

Figure 4:
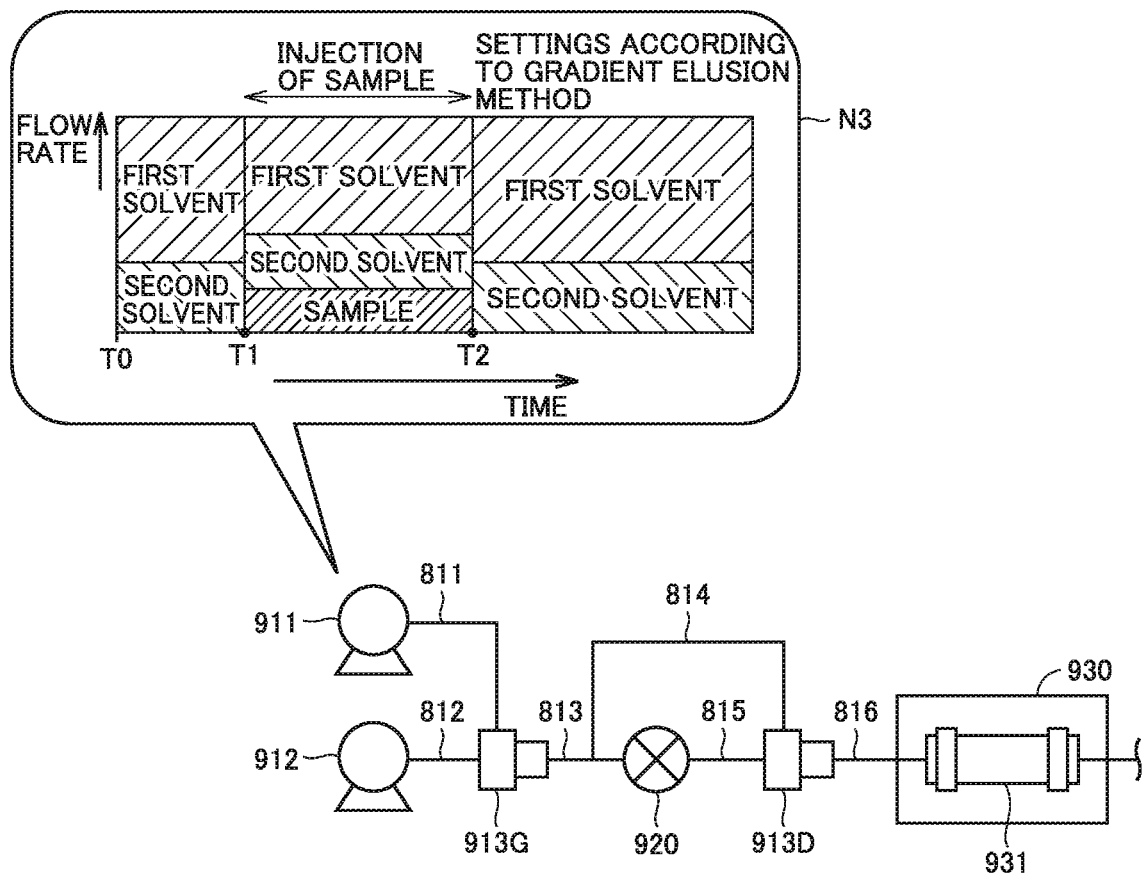
FIG. 4 shows a specific configuration example of a liquid feeding unit according to an existing technique.

(FIG. 4: Bypass Scheme)

The configuration example of FIG. 4 includes a first mixer 913G and a second mixer 913D. In FIG. 4, a first pump 911, a second pump 912, pipes 811, 812, 813, 814, 815, 816, an autosampler 920, and a column oven 930 are further included. Column oven 930 includes a column 931.

In the configuration example of FIG. 4, the first solvent supplied from first pump 911 is introduced through pipe 811 into first mixer 913G. The second solvent supplied from second pump 912 is introduced through pipe 812 into first mixer 913G. The first solvent and the second solvent are mixed in first mixer 913G, and then introduced through pipe 813 and pipe 816 into column 931.

The sample injected from autosampler 920 is introduced through pipe 815 into second mixer 913D.

In the configuration example of FIG. 4, pipe 814 functions as a bypass line. In other words, a part of the compound liquid (the first solvent and the second solvent) in pipe 813 is introduced through pipe 815 into second mixer 913D, and the rest is introduced through pipe 814 into second mixer 913D.

The compound liquid introduced through pipe 814 into second mixer 913D dilutes the sample from autosampler 920. The diluted sample is introduced from second mixer 9131 through pipe 816 into column 931, FIG. 4 shows a supplement N3 for illustrating a liquid feeding pattern in the dilution mode. Supplement N3 includes a graph indicating a pattern of liquid feeding to the analysis flow path (pipes 811 to 816) before and after injection of the sample from autosampler 920. In the graph, the vertical axis schematically represents a flow rate, and the horizontal axis represents a time.

As indicated in the graph of supplement N3, at time T0, driving of first pump 911 and second pump 912 is started. Thus, supply of the first solvent and the second solvent to the analysis flow path is started. Subsequently, at time T1 to time 12, the sample filling a sample loop connected with a valve switched in autosampler 920 is introduced into the analysis flow path. The sample is introduced into column 931 while being diluted with the compound liquid or the first solvent and the second solvent introduced through pipe 814 into second mixer 913D.

When the introduction of the sample is complete at time T2, the compound liquid of the first solvent and the second solvent is supplied to the analysis flow path as the mobile phase. Though a flow rate ratio between the first solvent and the second solvent at time T2 and thereafter is constant in FIG. 4, in actuality, the flow rate ratio between the first solvent and the second solvent at time T2 and thereafter may change based on settings (settings according to the gradient elusion method) adopted in analysis of the sample.

Figure 5:
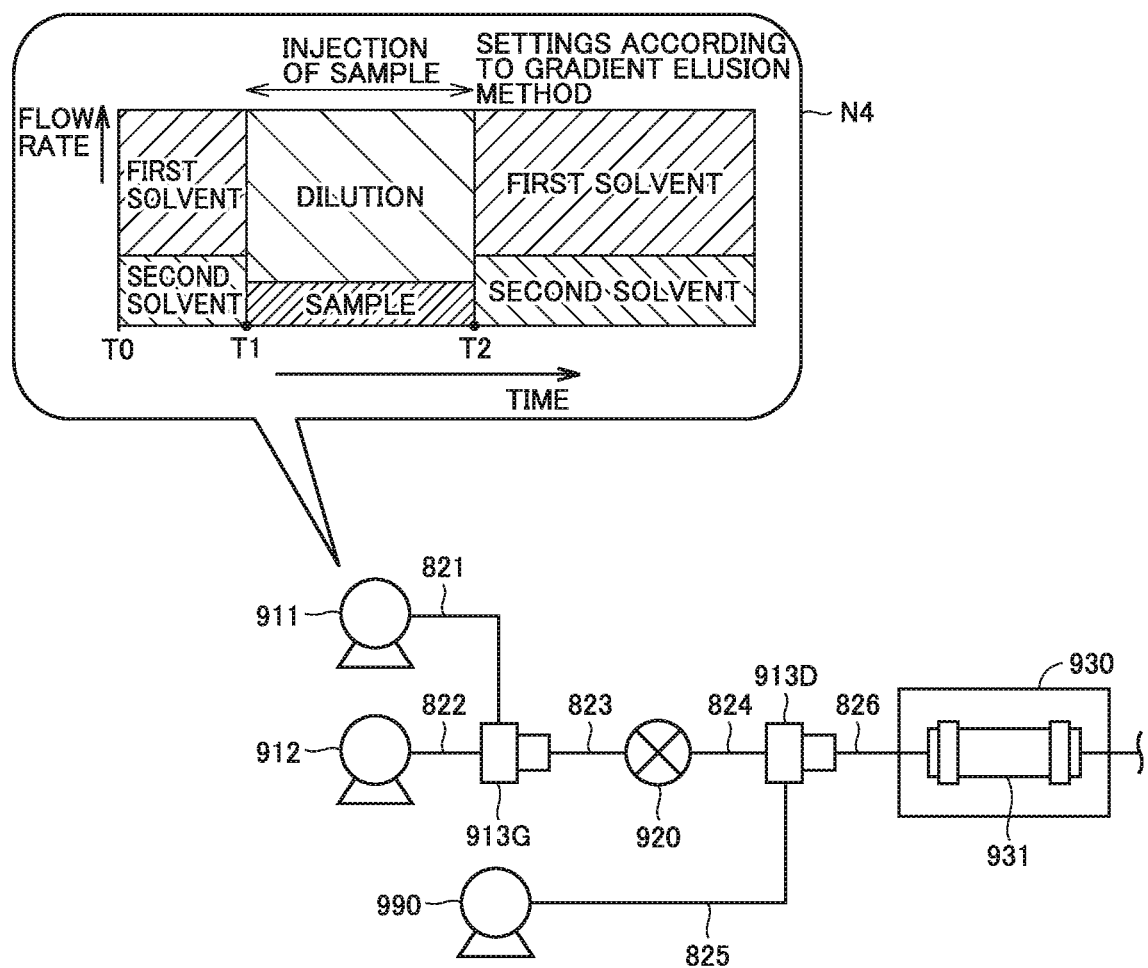
FIG. 5 shows a specific configuration example of a liquid feeding unit according to an existing technique.

(FIG. 5: Diluting Solution Introduction Scheme)

The configuration example of FIG. 5 includes first mixer 913G and second mixer 913D. In FIG. 5, first pump 911, second pump 912, a third pump 990, pipes 821, 822, 823, 824, 825, 826, autosampler 920, and column oven 930 are further included. Column oven 930 includes column 931. Third pump 990 supplies a solvent (diluting solvent) for diluting the sample to the analysis flow path.

In the configuration example of FIG. 5, the first solvent supplied from first pump 911 is introduced through pipe 821 into first mixer 913G. The second solvent supplied from second pump 912 is introduced through pipe 822 into first mixer 913G. The first solvent and the second solvent are mixed in first mixer 913G, and then introduced through pipe 823, pipe 824, and pipe 826 into column 931.

The sample introduced from autosampler 920 is introduced through pipe 824 into second mixer 913D. Third pump 990 supplies the diluting solvent through pipe 825 to second mixer 913D. The sample is diluted in second mixer 913, and then introduced through pipe 826 into column 931.

FIG. 5 shows a supplement N4 for illustrating a liquid feeding pattern in the dilution mode. Supplement N4 includes a graph indicating a pattern of liquid feeding to the analysis flow path (pipes 821 to 826) before and after injection of the sample from autosampler 920. In the graph, the vertical axis schematically represents a flow rate, and the horizontal axis represents a time.

As indicated in the graph of supplement N4, at time T0, driving of first pump 911 and second pump 912 is started. Thus, supply of the first solvent and the second solvent to the analysis flow path is started.

Then, at time T1 to time T2, the sample is introduced from autosampler 920 to second mixer 913D with reduced flow velocities of first pump 911 and second pump 912. At time T1 to time T2, third pump 990 is driven, so that the diluting solvent is introduced into second mixer 913D. The sample is diluted in second mixer 913D, and then introduced through pipe 826 into column 931.

When the introduction of the sample is complete at time T2, driving of third pump 990 is stopped, and the flow rates of first pump 911 and second pump 912 are returned to the flow rates before the reduction. The compound liquid of the first solvent and the second solvent is thus supplied to the analysis flow path as the mobile phase. Though the flow rate ratio between the first solvent and the second solvent at time T2 and thereafter is constant in FIG. 5, in actuality, the flow rate ratio between the first solvent and the second solvent at time T2 and thereafter may change based on settings (settings according to the gradient elusion method) adopted in analysis of the sample.

Figure 6:
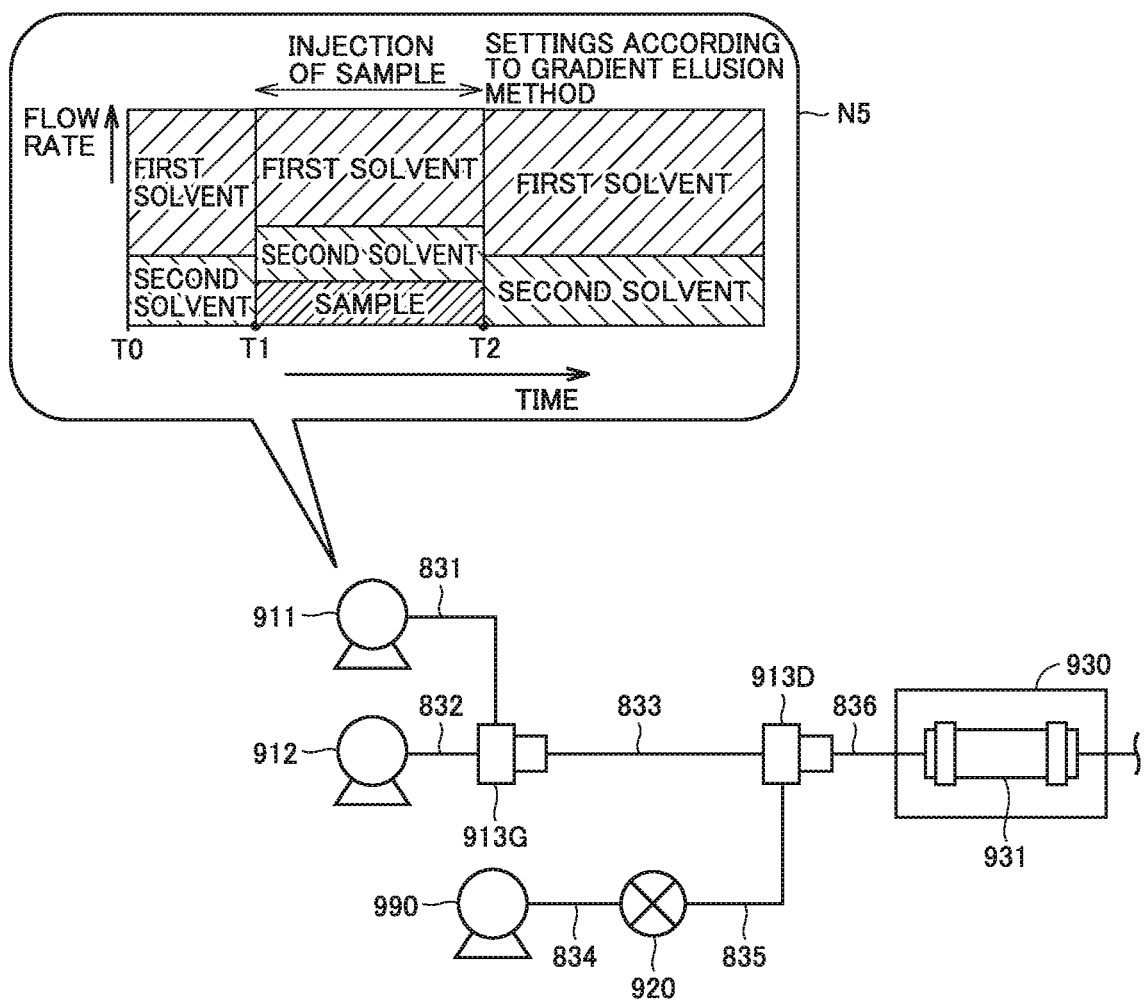
FIG. 6 shows a specific configuration example of a liquid feeding unit according to an existing technique.

(FIG. 6: Sample Solution Introduction Scheme)

The configuration example of FIG. 6 includes first mixer 913G and second mixer 913D. In FIG. 6, first pump 911, second pump 912, third pump 990, pipes 831, 832, 833, 834, 835, 836, autosampler 920, and column oven 930 are further included. Column oven 930 includes column 931. Third pump 990 supplies the solvent (diluting solvent) for diluting the sample to the analysis flow path.

In the configuration example of FIG. 6, the first solvent supplied from first pump 911 is introduced through pipe 831 into first mixer 913G. The second solvent supplied from second pump 912 is introduced through pipe 832 into first mixer 913G. The first solvent and the second solvent are mixed in first mixer 913G, and then introduced through pipe 833 and pipe 836 into column 931.

The sample injected from autosampler 920 is introduced through second mixer 913D and pipe 836 into column 931 while being diluted with the diluting solvent supplied from third pump 990 through pipe 834.

FIG. 6 shows a supplement N5 for illustrating a liquid feeding pattern in the dilution mode. Supplement N5 includes a graph indicating a pattern of liquid feeding to the analysis flow path (pipes 831 to 836) before and after injection of the sample from autosampler 920. In the graph, the vertical axis schematically represents a flow rate, and the horizontal axis represents a time.

As indicated in the graph of supplement N5, at time T0, driving of first pump 911 and second pump 912 is started. Thus, supply of the first solvent and the second solvent to the analysis flow path is started.

Subsequently, at time T1 to time T2, pump 990 is driven with reduced flow rates of first pump 911 and second pump 912, so that the sample is introduced from autosampler 920 to second mixer 913D. Thus, the sample is diluted with the first solvent from first pump 911 and the second solvent from second pump 912, and then introduced into column 931. At time T1 to time T2, the ratio between the first solvent and the second solvent may be similar to a ratio at time T0 or may be set to a different ratio. In other words, it suffices that this ratio is a ratio at which the sample is appropriately introduced from autosampler 920 into second mixer 913D, and is not particularly limited.

When the introduction of the sample is complete at time T2, driving of third pump 990 is stopped, and driving of first pump 911 and second pump 912 is restarted. Thus, the compound liquid of the first solvent and the second solvent is supplied to the analysis flow path as the mobile phase. Though the flow rate ratio between the first solvent and the second solvent at time T2 and thereafter is constant in FIG. 6, in actuality, the flow rate ratio between the first solvent and the second solvent at time T2 and thereafter may change based on settings (settings according to the gradient elusion method) adopted in analysis of the sample.

Figure 7:
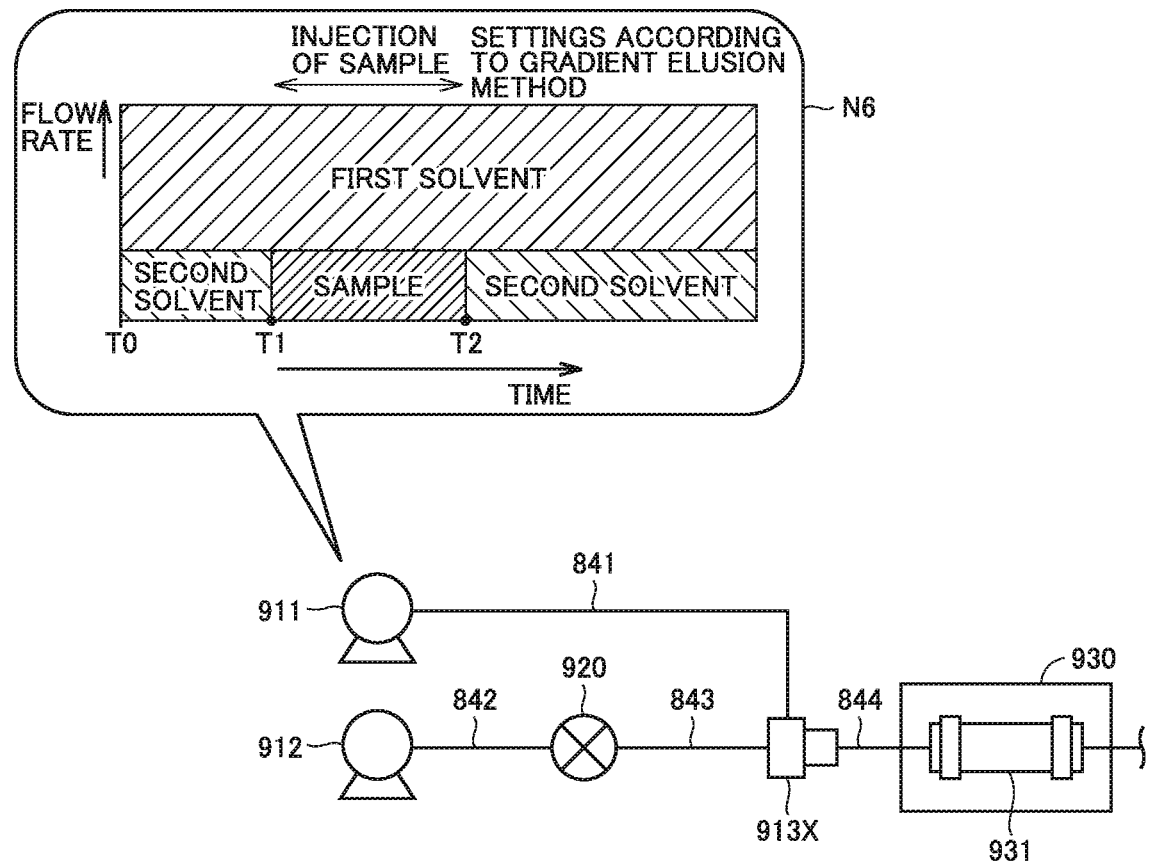
FIG. 7 shows a specific configuration example of a liquid feeding unit according to an existing technique.

(FIG. 7: High-Pressure Gradient Dilution Scheme)

The configuration example of FIG. 7 includes a mixer 913X. In FIG. 7, first pump 911, second pump 912, pipes 841, 842, 843, 844, autosampler 920, and column oven 930 are further included. Column oven 930 includes column 931.

In the configuration example of FIG. 7, the first solvent supplied from first pump 911 is introduced through pipe 841 into mixer 913X. The second solvent supplied from second pump 912 is introduced through pipe 842 and pipe 843 into mixer 913X. The first solvent and the second solvent are mixed in mixer 913X, and then introduced through pipe 844 into column 931.

The sample introduced from autosampler 920 is introduced through pipe 843 into mixer 913X. The sample is diluted with the first solvent in mixer 913X, and then introduced through pipe 844 into column 931.

FIG. 7 shows a supplement N6 for illustrating a liquid feeding pattern in the dilution mode. Supplement N6 includes a graph indicating a pattern of liquid feeding to the analysis flow path (pipes 841 to 844) before and after injection of the sample from autosampler 920. In the graph, the vertical axis schematically represents a flow rate, and the horizontal axis represents a time.

As indicated in the graph of supplement N6, at time T0, driving of first pump 911 and second pump 912 is started. Thus, supply of the first solvent and the second solvent to the analysis flow path is started.

Subsequently, at time T1 to time T2, the sample is introduced from autosampler 920 into mixer 913X. The sample is thus diluted with the first solvent in mixer 913X, and then introduced into column 931.

When the introduction of the sample is complete at time T2, the second solvent is introduced into mixer 913X. Thus, the compound liquid of the first solvent and the second solvent is supplied to the analysis flow path as the mobile phase. Though the flow rate ratio between the first solvent and the second solvent at time T2 and thereafter is constant in FIG. 7, in actuality, the flow rate ratio between the first solvent and the second solvent at time T2 and thereafter may change based on settings (settings according to the gradient elusion method) adopted in analysis of the sample.

[Comparison with Configurations According to Existing Techniques]

The configuration of the embodiment of the present disclosure has been described mainly with reference to FIGS. 2 and 3. Also, the configurations according to the existing techniques have been described with reference to FIGS. 4 to 7. The configuration of the embodiment of the present disclosure will now be described by comparison with the configurations according to the existing techniques.

FIG. 8 shows evaluations of the configuration of the present embodiment and each of the configurations according to the existing techniques in terms of five criteria. The five criteria are as follows.

(1) Change of dilution factor
(2) Introduction cost
(3) Change of dilution mixer
(4) Change of gradient mixer
(5) Performance of standard injection In FIG. 8, results are indicated by ranks A to C. Rank A represents that a configuration is suitable for an analysis in terms of a criterion. Rank B represents that it cannot be said that a configuration is suitable for an analysis in terms of a criterion. Rank C represents that a configuration is not suitable for an analysis in terms of a criterion. The contents and results of the criteria will be described below.

(1) Change of Dilution Factor

The criterion "change of dilution factor" means whether a dilution factor of a sample can be changed in the dilution mode.

In the bypass scheme (FIG. 4), the dilution factor is based on a ratio of diameter between the bypass line (pipe 814) that introduces the first solvent and the second solvent into second mixer 913D and pipe 815 that introduces the sample into second mixer 913D. In the bypass scheme (FIG. 4), the ratio of diameter between pipe 814 and pipe 815 is fixed. In the bypass scheme, accordingly, the dilution factor of the sample is fixed and cannot be changed. In the bypass scheme, thus, rank C is provided in terms of the criterion "change of dilution factor".

In both of the diluting solution introduction scheme (FIG. 5) and the sample solution introduction scheme (FIG. 6), the dilution factor of the sample can be changed by adjusting the flow rate of third pump 990. Also, in the high-pressure gradient dilution scheme (FIG. 7), the dilution factor of the sample can be changed by adjusting the flow rate of first pump 911. In the diluting solution introduction scheme, the sample solution introduction scheme, and the high-pressure gradient dilution scheme, thus, rank A is provided in terms of the criterion "change of dilution factor".

In the present embodiment, the dilution mode is shown in FIG. 3. In the configuration shown in FIG. 3, LC system 100 can change the dilution factor of the sample by adjusting the flow rate of first pump 11. Accordingly, rank A is provided to the configuration of the present embodiment in terms of the criterion "change of dilution factor".

(2) Introduction Cost

The second criterion "Introduction cost" means that an increase in cost can be suppressed in implementation of the LC system.

In comparison with the configurations of the bypass scheme (FIG. 4), the high-pressure gradient dilution scheme (FIG. 7), and the present embodiment (FIGS. 2 and 3), the diluting solution introduction scheme (FIG. 5) and the sample solution introduction scheme (FIG. 6) need the third pump (third pump 990).

Thus, in terms of the criterion "introduction cost", rank A is provided to the configurations of the bypass scheme (FIG. 4), the high-pressure gradient dilution scheme (FIG. 7), and the present embodiment. Contrastingly, rank C is provided to the diluting solution introduction scheme (FIG. 5) and the sample solution introduction scheme (FIG. 6).

The configuration of the present embodiment needs a component for switching analysis flow path 50 between the standard position (FIG. 2) and the dilution position (FIG. 3). However, such a component can be implemented by a flow path switching valve as described with reference to FIGS. 9 and 10. The flow path switching valve needs no expensive drive unit such as a pump. Even if the component for switching analysis flow path 50 between the standard position (FIG. 2) and the dilution position (FIG. 3) is required, thus, rank A is provided to the configuration of the present embodiment in terms of the criterion "introduction cost".

(3) Change of Dilution Mixer

The criterion "change of dilution mixer" means that the mixer used in dilution of the sample in the dilution mode can be changed.

In all of the configurations of FIGS. 4 to 6, second mixer 913D is detachable from the analysis flow path, and is accordingly replaceable. In the configuration of FIG. 7, mixer 913X is detachable from the analysis flow path, and is accordingly replaceable. In all of the configurations of FIGS. 4 to 7, thus, the mixer used in dilution of the sample in the dilution mode can be changed.

In the configurations of FIGS. 4 to 7, however, when each configuration is used in the standard mode, the sample always flows through the mixer used in dilution of the sample in the dilution mode. In the configurations of FIGS. 4 to 7, thus, change (replacement) of the mixer affects the analysis performance in the standard mode.

Contrastingly, such an effect is not caused in the configuration of the present embodiment. Specifically, in the configuration of the present embodiment, both of first mixer 13G and second mixer 13D are detachable from analysis flow path 50, and are accordingly replaceable. Moreover, in the standard mode, the sample introduced from autosampler 20 is not required to flow through the mixer (second mixer 13D) used in dilution of the sample in the dilution mode, as described with reference to FIG. 2. In the configuration of the present embodiment, thus, change (replacement) of second mixer 13D does not affect analysis performance in the standard mode.

As descried above, in terms of the criterion "change of dilution mixer", rank B is provided to the configurations of FIGS. 4 to 7, whereas rank A is provided to the configuration of the present embodiment.

(4) Change of Gradient Mixer

The criterion "change of gradient mixer" means that the mixer used to mix the first solvent and the second solvent according to the gradient elusion method can be changed in the standard mode.

In the configurations of FIGS. 4 to 7 and the configuration of the present embodiment, the mixer is detachable from the analysis flow path. In the configurations of FIGS. 4 to 7 and the configuration of the present embodiment, thus, the mixer used to mix the first solvent and the second solvent according to the gradient elusion method can be changed in the standard mode.

Note that mixer 913X in the configuration of FIG. 7 (high-pressure gradient dilution scheme) is used to mix the first solvent and the second solvent and to dilute the sample. In the configuration of FIG. 7, thus, the mixer used to mix the first solvent and the second solvent cannot be changed independently of the mixer for diluting the sample.

In terms of the criterion "change of gradient mixer", thus, rank A is provided to the configurations of FIGS. 4 to 6 and the configuration of the present embodiment, whereas rank B is provided to the configuration of FIG. 7.

(5) Performance of Standard Injection

The criterion "performance of standard injection" means the degree of analysis performance in the standard mode.

The bypass scheme (FIG. 4) is not suitable for an analysis in the standard mode. The reason for this is a behavior as follows. As long as the bypass line (pipe 814) is connected to second mixer 913D, when the sample from autosampler 20 is introduced into second mixer 913D, a part of the sample is fed through pipe 814 to pipe 813 and then flows through the sample at pipe 815 again and returns to pipe 814. In terms of the criterion "performance of standard injection", thus, rank C is provided to the configuration of FIG. 4.

It cannot be said that the diluting solution introduction scheme (FIG. 5) is suitable for the analysis in the standard mode. More specifically, it can also be said that in the diluting solution introduction scheme (FIG. 5), an analysis in the standard mode can be performed by stopping third pump 990. However, the sample flows through second mixer 913D before reaching column 931. As the sample flows through second mixer 913D, thus, the sample may be negatively affected. In terms of the criterion "performance of standard injection", thus, rank B is provided to the configuration of FIG. 5.

The sample solution introduction scheme (FIG. 6) is not suitable for the analysis in the standard mode. The reason for this is as follows. When third pump 990 is driven to feed the sample from autosampler 920 to column 931, the sample and the diluting solvent supplied from third pump 990 are mixed in second mixer 913D, and accordingly, the sample is diluted with the diluting solvent. In terms of the criterion "performance of standard injection", thus, rank C is provided to the configuration of FIG. 6.

The high-pressure gradient dilution scheme (FIG. 7) is not suitable for the analysis in the standard mode. The reason for this is as follows. When second pump 912 is driven to feed the sample from autosampler 920 to column 931, the sample and the second solvent supplied from second pump 912 are mixed in second mixer 913D, and accordingly, the sample is diluted with the second solvent. In terms of the criterion "performance of standard injection", thus, rank C is provided to the configuration of FIG. 7.

Contrastingly, in the configuration of the present embodiment, the sample from autosampler 20 reaches column 31 without passing through the mixer in the analysis in the standard mode, as described with reference to FIG. 2. In terms of the criterion "performance of standard injection", thus, rank A is provided to the configuration of the present embodiment.

In terms of at least one of the five criteria described in (1) to (5) above, evaluations other than A are provided to the configurations of FIGS. 4 to 7, as described with reference to FIG. 8. Contrastingly, an evaluation of rank A is provided to the configuration of the present embodiment in terms of all of the five criterion described in (1) to (5) above.

In particular, evaluations other than rank A are provided to all of the configurations of FIGS. 4 to 7 in terms of the criterion (criterion "performance of standard injection") described in (5), whereas an evaluation of rank A is provided to the configuration of the present embodiment.

[Specific Configuration Example of Liquid Feeding Unit]

Figure 9:
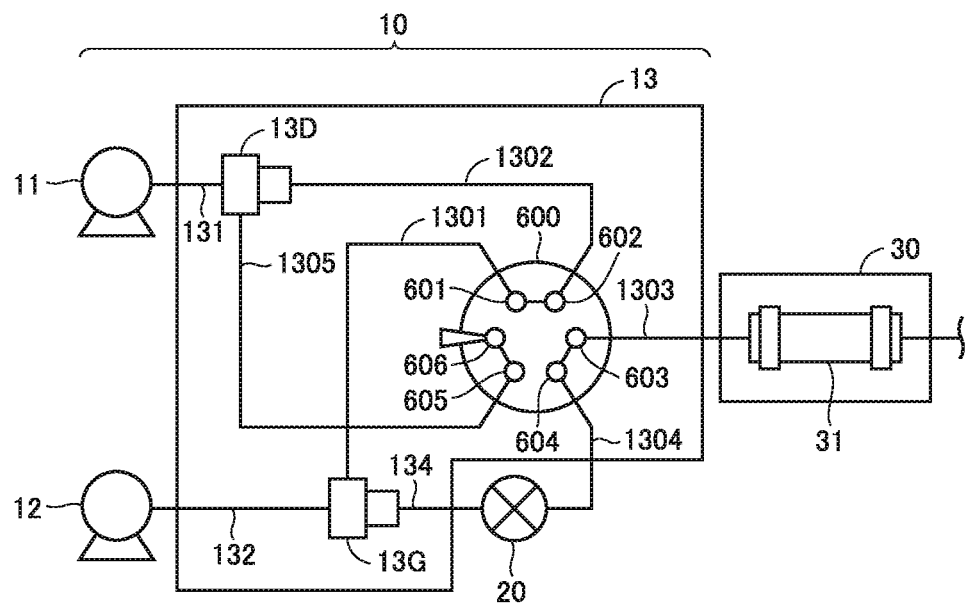
FIG. 9 shows a specific configuration example of liquid feeding unit 13.

FIG. 9 shows a specific configuration example of liquid feeding unit 13. In the example of FIG. 9, liquid feeding unit 13 includes first mixer 13G, second mixer 13D, and a flow path switching valve 600. Flow path switching valve 600 is implemented by, for example, a flow path switching valve manufactured by Shimadzu Corporation (https://www.an-.shimadzu.co.jp/hplc/prominence/modules/7_flow-change-over-valve.htm). Flow path switching valve 600 has six ports 601 to 606. Each of ports 601 to 606 can be coupled to its adjacent one port. Port 606 is a port that stops a flow. Flow path switching valve 600 switches a flow path in analysis flow path 50 by changing a set of connected ports among the plurality of ports. Consequently, the flow path in analysis flow path 50 can be switched while saving space.

First mixer 13G has three openings. The first opening is connected to first pump 11 by pipe 131. The second opening is connected to port 602 by pipe 1302. The third opening is connected to port 605 by a pipe 1305.

Second mixer 13D has three openings. The first opening is connected to second pump 12 by pipe 132. The second opening is connected to port 601 by a pipe 1301. The third opening is connected to autosampler 20 by pipe 134.

Figure 10:
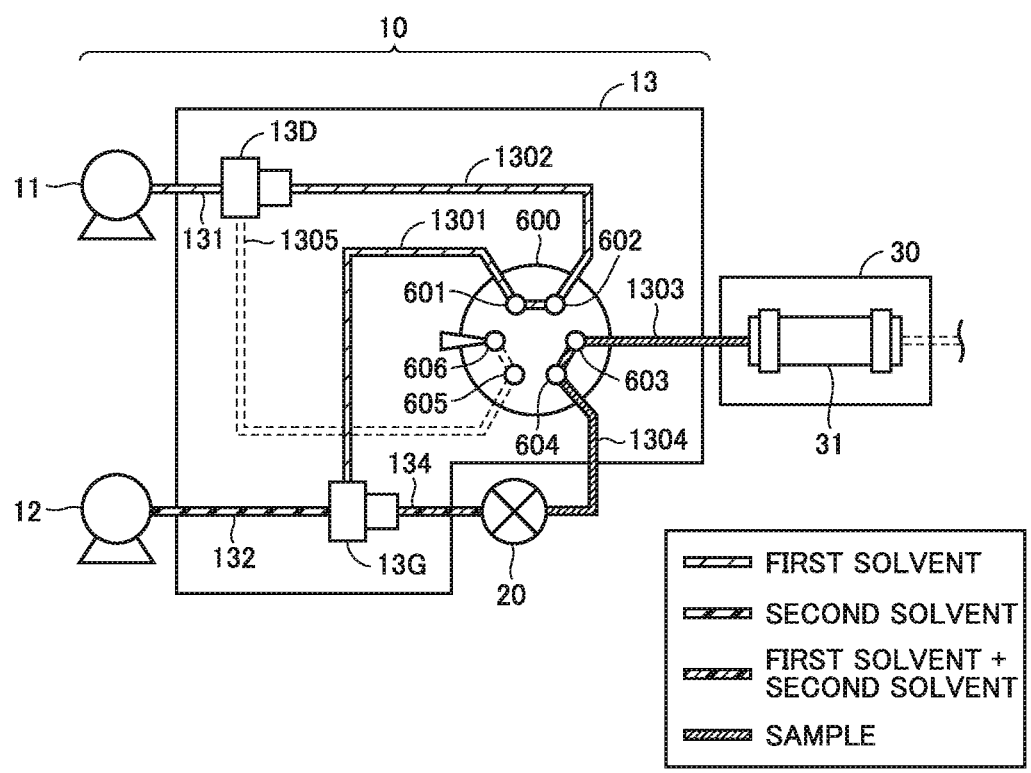
FIG. 10 shows a connection pattern example of ports 601 to 606 with a flow path switching valve 600 in a standard position.

FIG. 10 shows a connection pattern example of ports 601 to 606 at a standard position of flow path switching valve 600. As shown in FIG. 10, at the standard position, port 601 is connected to port 602, port 603 is connected to port 604, and port 605 is connected to port 606.

In FIG. 2, the first solvent flows through pipe 133. Pipe 133 of FIG. 2 is implemented by pipe 1302, port 602, port 601, and pipe 1301 of FIG. 10. In FIG. 2, the sample flows through pipe 135. Pipe 135 of FIG. 2 is implemented by pipe 1304, port 604, port 603, and a pipe 1303 of FIG. 10.

The first solvent flows through pipe 131, the second solvent flows through pipe 132, and the compound liquid of the first solvent and the second solvent flows through pipe 134.

Figure 11:
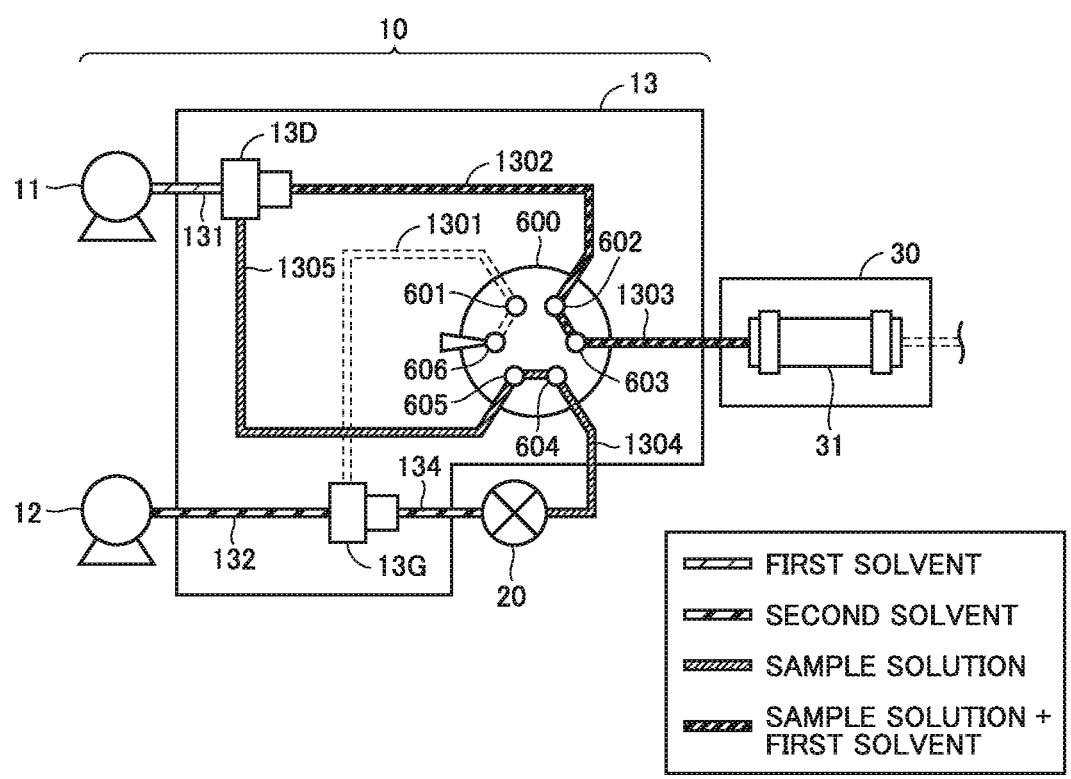
FIG. 11 shows a connection pattern example of ports 601 to 606 with flow path switching valve 600 in a dilution position.

FIG. 11 shows a connection pattern example of ports 601 to 606 at the dilution position of flow path switching valve 600.

As shown in FIG. 11, at the dilution position, port 601 is connected to port 606, port 603 is connected to port 602, and port 605 is connected to port 604.

In FIG. 3, the sample flows through pipe 135. Pipe 135 of FIG. 3 is implemented by pipe 1304, port 604, port 605, and pipe 1305 of FIG. 11.

In FIG. 3, the sample (sample+first solvent) diluted with the first solvent flows through pipe 136. Pipe 136 of FIG. 3 is implemented by pipe 1302, port 602, port 603, and pipe 1303 of FIG. 11. The first solvent flows through pipe 131, and the second solvent flows through pipe 132 and pipe 134.

[Process Flow]

Figure 12:
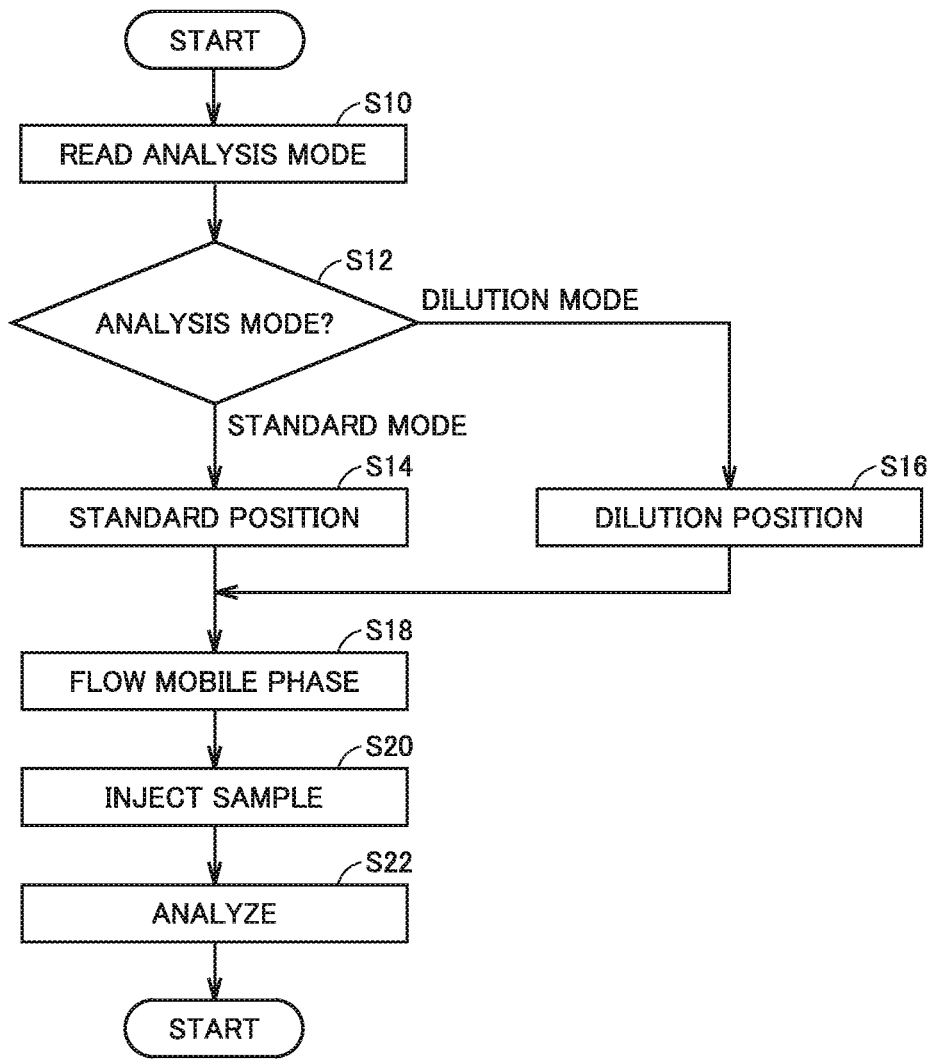
FIG. 12 is a flowchart of a process performed for analyzing a sample by LC system 100.

FIG. 12 is a flowchart of a process performed by LC system 100 to analyze a sample. In one implementation, the process of FIG. 12 is implemented as processor 61 of controller 60 executes a prescribed program.

At step S10, LC system 100 reads settings of an analysis mode. In one implementation, the analysis mode is registered with storage device 62, for example, as the user operates an input device. The input device registers the analysis mode with storage device 62 via interface 63.

At step S12, LC system 100 determines whether the read analysis mode is the standard mode or the dilution mode. LC system 100 moves control to step S14 when determining that the analysis mode is the standard mode and moves control to step S16 when determining that the analysis mode is the dilution mode.

At step S14, LC system 100 controls the state of liquid feeding unit 13 to the standard position (FIG. 2). In one implementation, at step S14, controller 60 controls the connection state of ports 601 to 606 of flow path switching valve 600 to the state shown in FIG. 10.

At step S16, LC system 100 controls the state of liquid feeding unit 13 to the dilution position (FIG. 3). In one implementation, at step S16, controller 60 controls the connection state of ports 601 to 606 of flow path switching valve 600 to the state shown in FIG. 11.

At step S18, LC system 100 starts flowing the mobile phase into analysis flow path 50 by starting driving of first pump 11 and second pump 12. The control of step S18 corresponds to a period from time T0 to time T1 shown in FIG. 2 and the like.

At step S20, LC system 100 causes autosampler 20 to inject the sample into analysis flow path 50. The control of step S20 corresponds to a period from time T1 to time T2 in FIG. 2 and the like.

At step S22, LC system 100 analyzes the sample. The control of step S22 corresponds to a period at time T2 and thereafter in FIG. 2 and the like. In one implementation, an analysis is performed as controller 60 obtains a detection signal based on the components of the sample separated in column 31 from detector 40 and processes the obtained detection signal. LC system 100 then ends the process of FIG. 12.

[Aspects]

A person skilled in the art understands that the illustrative embodiments described above are specific examples of the following aspects.

(Clause 1) A liquid feeding unit according to an aspect may be a liquid feeding unit that feeds a first solution and a second solution as a mobile phase to a column of a liquid chromatography analysis system. The first solution may be supplied from the first pump. The second solution may be supplied from the second pump. The liquid chromatography analysis system may include an injection part into which a sample is injected. The liquid feeding unit may include a first mixer, a second mixer, and a switch device that switches a flow path from the first pump and the second pump to the column between a first flow path and a second flow path. The first mixer and the second mixer may be included in each of the first flow path and the second flow path. In the first flow path, the first mixer may be located upstream of the injection part, and the second mixer may be located downstream of the injection part. In the second flow path, the first mixer and the second mixer may be located upstream of the injection part. The switch device may form the first flow path as the flow path in a first mode in which the sample is diluted before introduction into the column, and may form the second flow path as the flow path in a second mode in which the sample is not diluted before introduction into the column.

According to the liquid feeding unit of the first clause, in the mode in which the sample is diluted before introduction into the column, the sample injected from the injection part can be diluted by the second mixer. On the other hand, in the mode in which the sample is not diluted before introduction into the column, the sample can reach the column without flowing through both of the first mixer and the second mixer. Accordingly, the liquid chromatography analysis system is suitable not only for an analysis in the mode in which the sample is diluted before introduction into the column, but also for an analysis in the mode in which the sample is not diluted before introduction into the column.

(Clause 2) The liquid feeding unit according to the first clause may further include a controller that controls a state of the switch device. The controller may control the state of the switch device to form the first flow path in the first mode, and may control the state of the switch device to form the second flow path in the second mode.

According to the liquid feeding unit of the second clause, the state of the switch device can be controlled by the controller, thus reducing a burden for switching the state of the switch device by an operator of the liquid chromatography analysis system.

(Clause 3) In the liquid feeding unit according to the first or second clause, at least one of the first mixer and the second mixer may be detachable from the flow path.

According to the liquid feeding unit of the third clause, at least one of the first mixer and the second mixer can be changed.

(Clause 4) In the liquid feeding unit according to the third clause, the first mixer and the second mixer may have different mixing capacities.

According to the liquid feeding unit of the fourth clause, the capability of mixing solutions can be made different between the first mixer and the second mixer in accordance with a desire of the user of the liquid chromatography analysis system.

(Clause 5) In the liquid feeding unit according to any one of the first to fourth clauses, the switch device may include a flow path switching valve.

According to the liquid feeding unit of the fifth clause, the switch device can be implemented while saving space.

(Clause 6) A liquid chromatography analysis system according to an aspect may be a liquid chromatography analysis system that uses a first solution and a second solution as a mobile phase. The liquid feeding unit may include a column, a first pump that supplies the first solution, a second pump that supplies the second solution, a sampler that injects a sample toward the column, a first mixer, a second mixer, and a switch device that switches a flow path from the first pump and the second pump to the column between a first flow path and a second flow path. The first mixer and the second mixer may be included in each of the first flow path and the second flow path. In the first flow path, the first mixer may be located upstream of an injection part into which the sample is injected by the sampler, and the second mixer may be located downstream of the injection part. In the second flow path, the first mixer and the second mixer may be located upstream of the injection part. The switch device may form the first flow path as the flow path in a first mode in which the sample is diluted before introduction into the column, and may form the second flow path as the flow path in a second mode in which the sample is not diluted before introduction into the column.

According to the liquid chromatography analysis system of the sixth clause, in the mode in which the sample is diluted before introduction into the column, the sample injected from the injection part can be diluted by the second mixer. On the other hand, in the mode in which the sample is not diluted before introduction into the column, the sample can reach the column without flowing through both of the first mixer and the second mixer. The liquid chromatography analysis system is thus suitable not only for the mode in which the sample is diluted before introduction into the column but also for the analysis in the mode in which the sample is not diluted before introduction into the column.

(Clause 7) The liquid chromatography analysis system according to the sixth clause may further include a controller that controls a state of the switch device. The controller may control the state of the switch device to form the first flow path in the first mode, and may control the state of the switch device to form the second flow path in the second mode.

According to the liquid chromatography analysis system of the seventh clause, the state of the switch device is controlled by the controller. This can reduce a burden for switching the state of the switch device by the operator of the liquid chromatography analysis system.

(Clause 8) In the liquid chromatography analysis system according to the sixth or seventh clause, at least one of the first mixer and the second mixer may be detachable from the flow path.

According to the liquid chromatography analysis system of the eighth clause, at least one of the first mixer and the second mixer can be replaced.

(Clause 9)

In the liquid chromatography analysis system according to the eighth clause, the first mixer and the second mixer may have different mixing capacities.

According to the liquid chromatography analysis system of the ninth clause, the capability of mixing the solutions can be made different between the first mixer and the second mixer in accordance with a desire of a user of the liquid chromatography analysis system.

(Clause 10) In the liquid chromatography analysis system according to any one of the sixth to ninth clauses, the switch device may include a flow path switching valve.

According to the liquid chromatography analysis system of the tenth clause, the switch device can be implemented while saving space.

(Clause 11)

A control method according to an aspect may be a control method for a liquid chromatography analysis system that uses a first solution and a second solution as a mobile phase, and the control method may be implemented by a computer. The control method may include: obtaining an analysis mode; and controlling a flow path from a first pump and a second pump to a column of the liquid chromatography analysis system in accordance with the analysis mode, the first pump supplying the first solution, the second pump supplying the second solution, the liquid chromatography analysis system may include an injection part into which a sample is injected, a first mixer, and a second mixer, and the controlling the flow path may include: when the analysis mode is a first mode in which the sample is diluted before introduction into the column, controlling the flow path such that the first mixer is located upstream of the injection part and the second mixer is located downstream of the injection part; and when the analysis mode is a second mode in which the sample is not diluted before introduction into the column, controlling the flow path such that the first mixer and the second mixer are located upstream of the injection part.

According to the control method of the eleventh clause, in the mode in which the sample is diluted before introduction into the column, the sample injected from the injection part can be diluted by the second mixer. On the other hand, in the mode in which the sample is not diluted before introduction into the column, the sample can reach the column without flowing through both of the first mixer and the second mixer. The liquid chromatography analysis system is thus suitable not only for an analysis in the mode in which the sample is diluted before introduction into the column but also for an analysis in the mode in which the sample is not diluted before introduction into the column.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A control method for a liquid chromatography analysis system that uses a first solution and a second solution as a mobile phase, the control method being implemented by a computer, the control method comprising:
   obtaining an analysis mode; and
   controlling a flow path from a first pump and a second pump to a column of the liquid chromatography analysis system in accordance with the analysis mode, the first pump supplying the first solution, the second pump supplying the second solution, wherein
   the liquid chromatography analysis system includes an injection part into which a sample is injected, a first mixer, and a second mixer, and
   the controlling the flow path includes
     when the analysis mode is a first mode in which the sample is diluted before introduction into the column, controlling the flow path such that the first mixer is located upstream of the injection part and the second mixer is located downstream of the injection part, and
     when the analysis mode is a second mode in which the sample is not diluted before introduction into the column, controlling the flow path such that the first mixer and the second mixer are located upstream of the injection part.

\* \* \* \* \*